(12) United States Patent
Seidl

(10) Patent No.: US 6,199,885 B1
(45) Date of Patent: Mar. 13, 2001

(54) SUSPENSION SYSTEM FOR THE FRONT WHEEL OF A MOTORCYCLE

(75) Inventor: Josef Seidl, Dingolfing (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/293,056

(22) Filed: Apr. 16, 1999

(30) Foreign Application Priority Data

May 20, 1998 (DE) .............................. 198 22 730

(51) Int. Cl.⁷ ...................... B62K 11/12; B62K 25/08
(52) U.S. Cl. ............................................... 280/276
(58) Field of Search ........................ 280/276, 279, 280/277, 274, 275; 180/219

(56) References Cited

U.S. PATENT DOCUMENTS

| | | | |
|---|---|---|---|
| 5,156,231 | * 10/1992 | Trema | 180/227 |
| 5,249,650 | * 10/1993 | Tanaka | 188/344 |
| 5,799,963 | * 9/1998 | Berkmann | 280/276 |
| 5,813,684 | * 9/1998 | Baron | 280/276 |
| 5,967,538 | * 10/1999 | Callaluca et al. | 280/279 |

FOREIGN PATENT DOCUMENTS

| | | |
|---|---|---|
| 906 180 | 3/1954 | (DE) . |
| 37 03 736 | 2/1988 | (DE) . |
| 4110954A1 | 10/1992 | (DE) . |
| 19508499C1 | 2/1996 | (DE) . |
| 19649724A1 | 6/1998 | (DE) . |
| 238768 | * 12/1986 | (EP) . |
| 3-281490 | * 12/1991 | (JP) . |

* cited by examiner

Primary Examiner—Brian L. Johnson
Assistant Examiner—Avraham H. Lerner
(74) Attorney, Agent, or Firm—Evenson, McKeown, Edwards & Lenahan, P.L.L.C.

(57) ABSTRACT

A suspension system for the front wheel of a motorcycle, comprising a ball joint fork, which is rotatably and swivellably connected with the vehicle frame; a suspension element which is connected with the vehicle frame and by way of a ball joint is connected with a lower fork bridge; and spring elements which are supported on a movable part of the suspension system and on the vehicle frame. The suspension element is constructed as a central suspension element with a linear suspension function and is rigidly connected to the forward frame of the motorcycle.

18 Claims, 3 Drawing Sheets

SUSPENSION SYSTEM FOR THE FRONT WHEEL OF A MOTORCYCLE

BACKGROUND AND SUMMARY OF THE INVENTION

This application claims the priority of German application 198 22 730, filed in Germany on May 20, 1998.

The invention relates to a suspension system for the front wheel of a motorcycle, comprising a ball joint fork, which is rotatably and swivellably connected with the vehicle frame; a suspension element which is connected with the vehicle frame and by way of a ball joint is connected with a lower fork bridge; and spring elements which are supported on a movable part of the suspension system and on the vehicle frame.

A suspension system of this type is described in German Patent Document DE 41 10 954 A1. In the case of this known suspension system, the suspension element is constructed as a longitudinal control arm which is swivellable about a transverse axis connected at the rearward end with the vehicle frame.

In the case of this type of a suspension system, the forward bearing point of the longitudinal control arm, specifically the ball joint on the lower fork bridge, during the compression of the front wheel, moves along an arc of a circle about the rearward bearing point of the longitudinal control arm. The path of motion of the ball joint therefore has a horizontal component which is a function of the swivelling angle of the longitudinal control arm. The circumstance that this horizontal component changes during the compression of the front wheel is, however, disadvantageous for the suspension performance. It was therefore attempted to construct the longitudinal control arm as long as possible so that the radius of the path of motion of its forward bearing point is as large as possible and its curvature is therefore as small as possible. However, the length of the longitudinal control arm is constructively limited, particularly when the engine extends far to the front.

It is an object of the invention to further develop the suspension system of the above-mentioned type such that an optimal path of motion of the ball joint of the lower fork bridge can be achieved during the compression.

According to the invention, this object is achieved in that the suspension element is constructed as a central suspension element with a linear suspension function and is rigidly fastened to the forward frame of the motorcycle.

A longitudinal control arm can be eliminated in the case of the suspension system according to the invention. This also eliminates the costs connected with the development, storage and mounting of this component. Another advantage is the reduction of weight. By the selection of the inclination of the central suspension element, the path of motion of the ball joint fastened to the lower fork bridge can be influenced, and a path of motion can be achieved for which in the prior art a longitudinal control arm of considerable length would have been required. The suspension system according to the invention can also be used under narrow space conditions, for example, in the case of a motorcycle with an engine which projects far toward the front. The central suspension element is easily accessible for adjusting the suspension and the damping, and the chassis data and the kinematic characteristics can be changed without any major influence on the remaining vehicle.

The spring elements are preferably installed into the central suspension element.

The invention can be implemented in that the ball joint fork is constructed with a constant length and is swivellably and axially displaceably connected with an upper fork bridge. In the case of such a construction of the suspension, the spring elements or additional spring elements can be constructed as coil pressure springs which are supported on the upper fork bridge and on the ball joint fork.

However, the invention can also be implemented in that the ball joint fork is constructed as a telescopic fork and in that the lower fork bridge connects the two sliding tubes with one another.

Other objects, advantages and novel features of the present invention will become apparent from the following detailed description of the invention when considered in conjunction with the accompanying drawings.

DETAILED DESCRIPTION OF THE DRAWINGS

Figure 1:
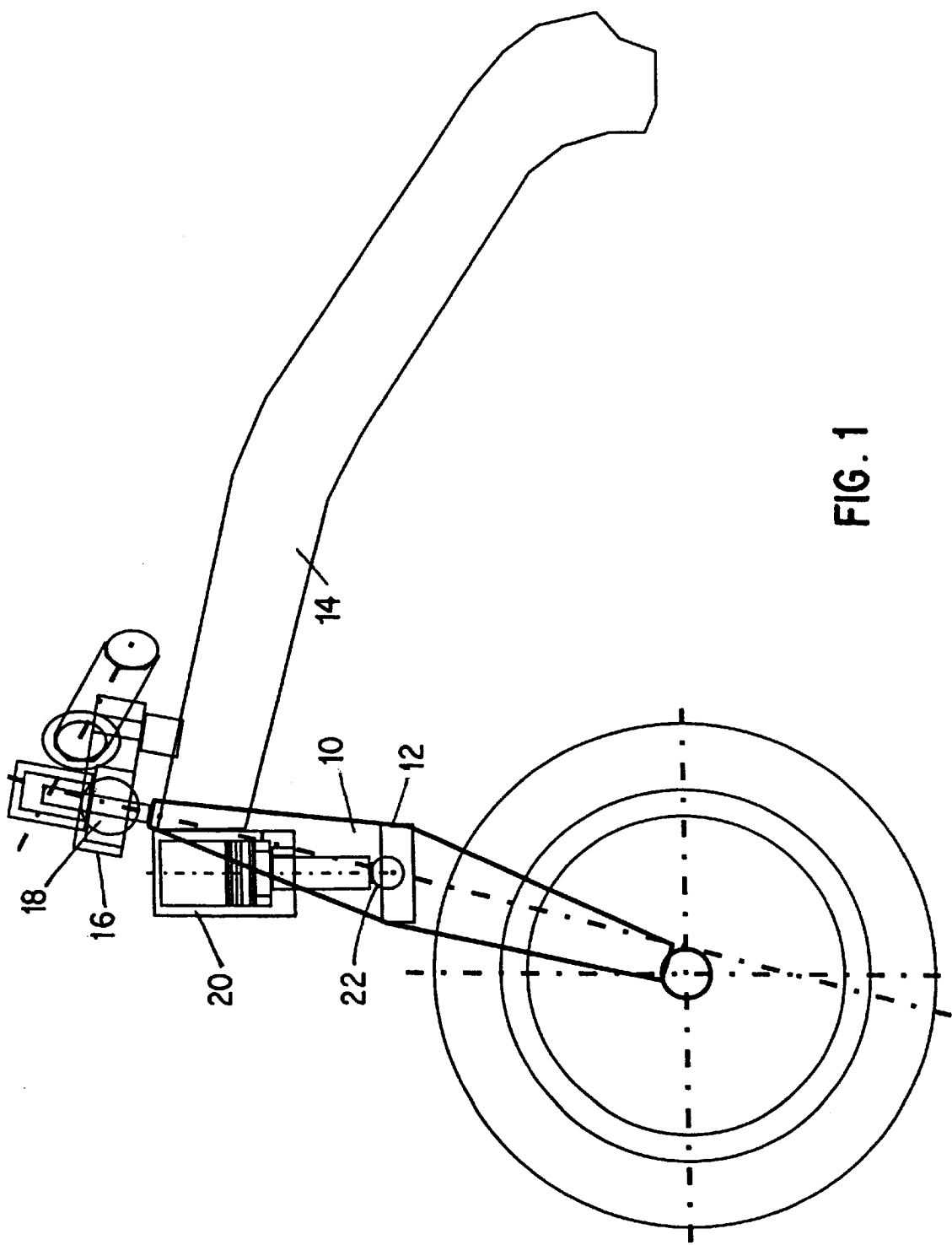
FIG. 1 is a schematic representation of a suspension system for the front wheel of a motorcycle, constructed according to a first embodiment of the invention.

FIG. 1 illustrates a wheel carrier constructed as a ball joint fork which consists of two members 10 of constant lengths which are mutually connected by a lower fork bridge 12. The upper end of each member 10 is axially displaceably and swivellably connected with an upper fork bridge 16. The upper fork bridge 16 is, in turn, swivellably connected with a forward frame 14 of the motorcycle. In the embodiment illustrated in FIG. 1, the upper end of each member 10 is disposed in a ball joint 18. However, instead of a ball joint, a rubber joint can also be used which has a rotatory degree of freedom. A central suspension element, which is constructed as a spring strut 20, is rigidly fastened to the forward frame 14 and is connected with a ball joint 22 mounted on the lower fork bridge 12. This central suspension element can absorb transverse forces and ensures a linear path of motion of the ball joint 22 which is in parallel to its longitudinal axis. Spring elements are installed into the spring strut 20 which may be mechanical, pneumatic or hydraulic spring elements. The pneumatic or hydraulic spring elements can simultaneously cause a damping of the suspension movement.

During the compression of the front wheel, the two members 10 move upwards, their upper ends being axially displaceably guided in the two upper ball joints 18. The lower fork bridge 12 or the ball joint 22 fastened thereto is guided in a direction which is parallel to the longitudinal axis of the spring strut 20. A swivelling motion is therefore superimposed on the axial motion of the two members 10 in the upper ball joints 18.

Figure 2:
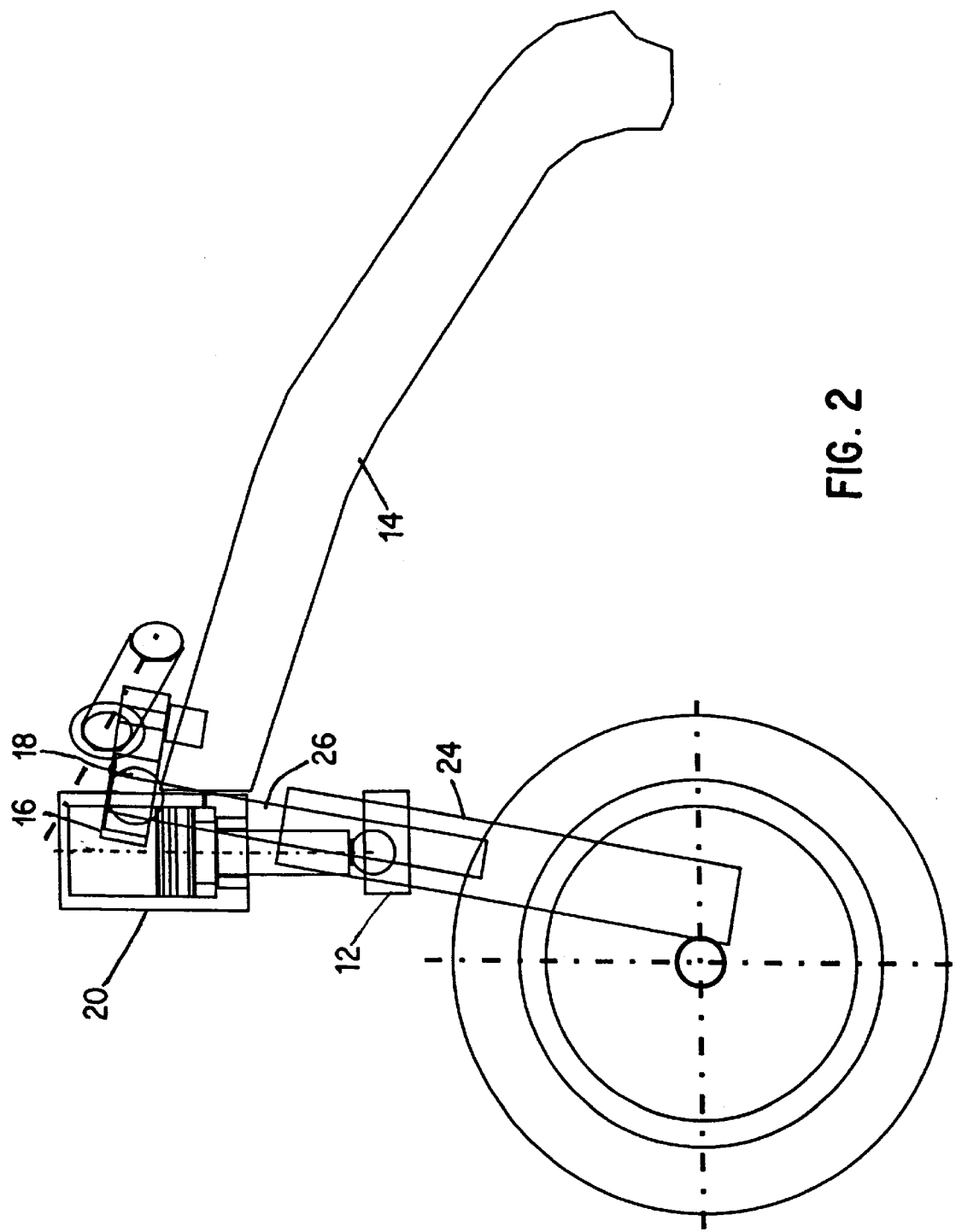
FIG. 2 is a schematic representation of a suspension system for the front wheel of a motorcycle, constructed according to a second embodiment of the invention.

In the embodiment illustrated in FIG. 2, the wheel carrier is constructed as a telescopic fork; that is, the member 10 of a constant length of the first embodiment is replaced by a sliding tube 24 and an upright tube 26. The construction of such a telescopic fork is described in detail in the initially mentioned German Patent Document DE 41 10 954 A1. The sliding tube 24 is axially displaceably guided on the upright tube 26. In this embodiment, each upright tube 26 is axially fixedly but swivellably connected with the upper fork bridge 16. In the illustrated embodiment, this joint connection 18 is constructed as a ball joint. However, it may also be a rubber joint. As in the first embodiment, the fork bridge 12 connected with the two sliding tubes 24 is resiliently supported by way of a spring strut 20 with respect to the forward frame 14 and caused to carry out a vertical movement.

Figure 3:
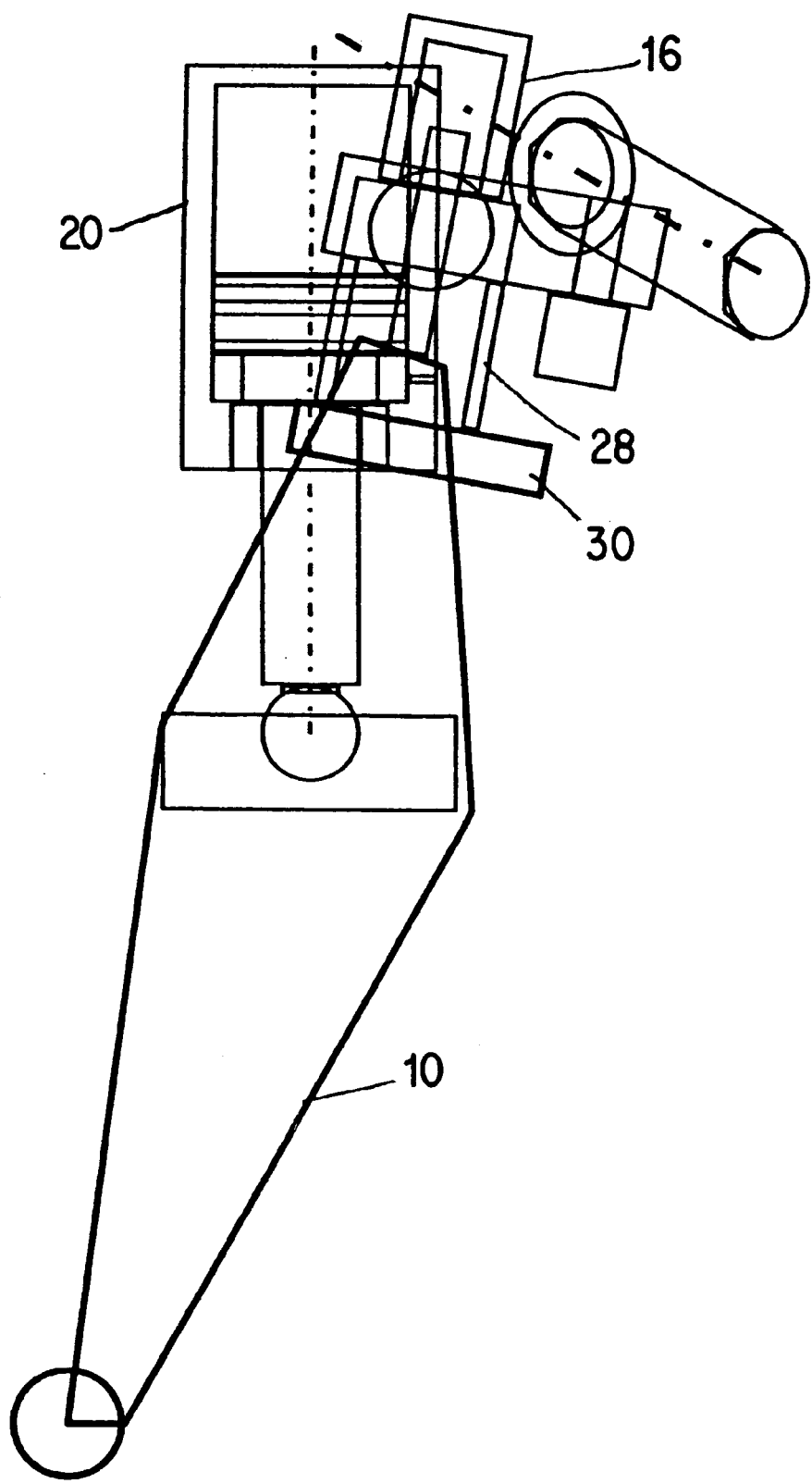
FIG. 3 is a schematic representation of a suspension system for the front wheel of a motorcycle, constructed according to a third embodiment of the invention.

The embodiment illustrated in FIG. 3 differs from the embodiment illustrated in FIG. 1 in that a coil pressure spring 28 is assigned to each of the two longitudinally constant members 10 of the ball joint fork. This coil pressure spring 28 is supported on the upper fork bridge 16 and on a ring shoulder 30 of the member 10. As in the first embodiment, the two members 10 are connected by a lower fork bridge which, by way of a spring strut 20 fastened to the forward frame, is caused to carry out a vertical movement. When the front wheel is compressed, the two members 10, while the assigned coil pressure springs 28 are compressed, move upward with respect to the upper fork bridge 16, their upper ends being axially displaceably and swivellably guided in the assigned ball joints.

In the embodiment illustrated in FIG. 3, the spring strut may be constructed such that it exclusively carries out a guiding and damping function because the spring function is taken over by the two coil pressure springs 28. This idea can also be used in the embodiment illustrated in FIG. 2 in that the spring elements are arranged in the two sliding tubes 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Suspension system for the front wheel of a motorcycle, comprising:
   a ball joint fork, which is rotatably and swivellably connected in use with a vehicle frame,
   a suspension element which is connected with the vehicle frame and by way of a ball joint is connected with a lower fork bridge, and
   spring elements which are supported on a movable part of the suspension system and on the vehicle frame,
   wherein the suspension element is constructed as a central suspension element with a linear suspension function and is rigidly fastened to a forward frame section of the vehicle frame.

2. Suspension system according to claim 1, wherein the spring elements are installed into the central suspension element.

3. Suspension system according to claim 1, wherein the ball joint fork has a constant length and is swivellably and axially displaceably connected with an upper fork bridge.

4. Suspension system according to claim 2, wherein the ball joint fork has a constant length and is swivellably and axially displaceably connected with an upper fork bridge.

5. Suspension system according to claim 3, wherein the spring elements or additional spring elements are constructed as coil pressure springs which are supported on the upper fork bridge and on the ball joint fork.

6. Suspension system according to claim 2, wherein the ball joint fork is constructed as a telescopic fork, and
   wherein the lower fork bridge connects two sliding tubes of the telescopic fork with one another.

7. A motorcycle comprising:
   a front wheel,
   a forward frame,
   a wheel carrier including a pair of wheel carrier members having lower ends supporting the front wheel,
   a lower fork bridge connecting the wheel carrier members together,
   an upper fork bridge swivellably connected with the forward frame, said upper bridge being axially displaceably and swivellably connected with the wheel carrier members at a position above the lower fork bridge, and
   a linear suspension device including spring elements and having an upper end rigidly fastened to the forward frame and a lower end pivotally connected with the lower fork bridge.

8. A motorcycle according to claim 7, wherein the linear suspension device is operable during movement of the front wheel with respect to the forward frame to elastically support wheel movements with the lower fork bridge guided to move parallel to a longitudinal axis of the linear suspension element with a swivelling motion superimposed on axial motion of the two wheel carrier members by the connection at the upper fork bridge.

9. A motorcycle according to claim 7, wherein the spring elements are installed internally of the linear suspension device.

10. A motorcycle according to claim 7, wherein the linear suspension device has a constant length and is swivellably and axially displaceably connected with the upper fork bridge.

11. A motorcycle according to claim 7, wherein the spring elements are constructed as coil pressure springs supported on the upper fork bridge and on the wheel carrier members.

12. A motorcycle according to claim 7, wherein the carrier members are constructed as a telescopic fork.

13. A suspension system for supporting a front wheel of a motorcycle at a motorcycle forward frame, comprising:
   a wheel carrier including a pair of wheel carrier members having lower ends for supporting the front wheel,
   a lower fork bridge connecting the wheel carrier members together,
   an upper fork bridge swivellably connectable with the forward frame, said upper bridge being axially displaceably and swivellably connected with the wheel carrier members at a position above the lower fork bridge, and
   a linear suspension device including spring elements and having an upper end rigidly fastenable to the forward frame and a lower end pivotally connected with the lower fork bridge.

14. A suspension system according to claim 13, wherein the linear suspension device is operable during movement of the front wheel with respect to the forward frame to elastically support wheel movements with the lower fork bridge guided to move parallel to a longitudinal axis of the linear suspension element with a swivelling motion superimposed on axial motion of the two wheel carrier members by the connection at the upper fork bridge.

15. A suspension system according to claim 13, wherein the spring elements are installed internally of the linear suspension device.

16. A suspension system according to claim 13, wherein the linear suspension device has a constant length and is swivellably and axially displaceably connected with the upper fork bridge.

17. A suspension system according to claim 13, wherein the spring elements are constructed as coil pressure springs supported on the upper fork bridge and on the wheel carrier members.

18. A suspension system according to claim 13, wherein the carrier members are constructed as a telescopic fork.

* * * * *